United States Patent
Axnix et al.

(10) Patent No.: US 10,298,392 B2
(45) Date of Patent: May 21, 2019

(54) RESOURCE ENTITLEMENT IN A MULTI-COMPUTER SYSTEM CONTROLLED BY A SINGLE INSTANCE

(71) Applicant: INTERNATIONAL BUSINESS MACHINES CORPORATION, Armonk, NY (US)

(72) Inventors: Christine Axnix, Dettenhausen (DE); Jakob C. Lang, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 14/525,923

(22) Filed: Oct. 28, 2014

(65) Prior Publication Data

US 2015/0134790 A1 May 14, 2015

(30) Foreign Application Priority Data

Nov. 8, 2013 (GB) .................................. 1319709.0

(51) Int. Cl.
| | |
|---|---|
| *H04L 12/24* | (2006.01) |
| *H04L 29/06* | (2006.01) |
| *H04L 9/30* | (2006.01) |
| *H04L 29/08* | (2006.01) |

(Continued)

(52) U.S. Cl.
CPC .................. *H04L 9/30* (2013.01); *G09C 1/00* (2013.01); *H04L 9/3234* (2013.01); *H04L 63/0442* (2013.01); *H04L 63/0457* (2013.01); *H04L 63/0853* (2013.01); *H04L 2463/103* (2013.01)

(58) Field of Classification Search
CPC .............. H04L 29/06; H04L 29/08981; H04L 29/08072; H04L 41/082; H04L 41/0816; H04L 67/10; H04L 63/06; H04L 9/30; H04L 9/3234; H04L 63/0457; H04L 63/0853; H04L 63/0442; H04L 2463/103;

(Continued)

(56) References Cited

U.S. PATENT DOCUMENTS

| | | | |
|---|---|---|---|
| 6,463,454 | B1 | 10/2002 | Lumelsky et al. |
| 6,516,350 | B1 | 2/2003 | Lumelsky et al. |
| 6,938,256 | B2 | 8/2005 | Deng et al. |

(Continued)

FOREIGN PATENT DOCUMENTS

| | | |
|---|---|---|
| EP | 2317767 A1 | 5/2011 |
| GB | 2461160 A | 12/2009 |
| WO | WO2004055687 A1 | 7/2004 |

OTHER PUBLICATIONS

Search Report for GB1319709.0 dated Apr. 14, 2014, 3 pages.

*Primary Examiner* — Andrew C Georgandellis
*Assistant Examiner* — Mehulkumar J Shah
(74) *Attorney, Agent, or Firm* — Heslin Rothenberg Farley & Mesiti P.C.

(57) ABSTRACT

An entitlement system includes at least two computing devices and a management controller which all include a trusted platform module. Each of the trusted platform modules include a non-volatile storage for storing entitlement records. A management unit of each computing device includes configuration means to enable and disable computing resources of the respective computing device based on entitlement records. The management controller receives ensemble entitlement records in encrypted form and distributes sub-entitlement records in a second encrypted form to the management units of the computing devices.

17 Claims, 5 Drawing Sheets

(51) Int. Cl.
*G09C 1/00* (2006.01)
*H04L 9/32* (2006.01)

(58) Field of Classification Search
CPC ........... H04L 12/24; H04L 29/08; G06F 8/65; G09C 1/00
USPC .............................. 709/221; 712/15; 713/100
See application file for complete search history.

(56) References Cited

U.S. PATENT DOCUMENTS

| | | |
|---|---|---|
| 8,253,552 B2 | 4/2012 | Axnix et al. |
| 2004/0123097 A1* | 6/2004 | Ranjan ............. G11B 20/00086 713/153 |
| 2009/0187751 A1* | 7/2009 | Axnix ..................... G06F 9/468 713/1 |
| 2009/0303030 A1* | 12/2009 | Axnix ..................... G06F 21/73 340/501 |
| 2009/0319635 A1 | 12/2009 | Christopherson et al. |
| 2012/0257749 A1* | 10/2012 | Gremaud ............. H04N 7/1675 380/210 |
| 2012/0323750 A1* | 12/2012 | Sivaramakrishnan .. G06F 21/10 705/34 |
| 2014/0181912 A1* | 6/2014 | Kling ................... H04L 63/102 726/4 |

* cited by examiner

RESOURCE ENTITLEMENT IN A MULTI-COMPUTER SYSTEM CONTROLLED BY A SINGLE INSTANCE

PRIOR FOREIGN APPLICATION

This application claims priority from United Kingdom patent application number 1319709.0, filed Nov. 8, 2013, which is hereby incorporated herein by reference in its entirety.

BACKGROUND

One or more aspects of the invention relate generally to entitlement for resources in a multi-computer or multi-resource system.

An important capability of modern computer systems is the ability to adjust the available processor and memory capacity, as well as features of other resources depending on requirements, in particular workload requirements. Today's computer systems, such as, e.g., the IBM System z or the IBM System p, provide the capability to activate and deactivate processing capacities in parallel to a normal system operation. This means that for reconfiguration purposes, the computer system does not need to be shut down and consequently rebooted. Instead, non-active physical capacities may be activated "on the fly" and may be controlled by so-called entitlement records that may be specific for a certain resource of the computer system. If a group of computer systems may be controlled by entitlement records, there may be a process to ensure that in sum not more resources are used in the complete ensemble of computer systems than related ensemble entitlement records may allow.

There are several disclosures related to entitlement systems.

For example, Document U.S. Pat. No. 8,253,552 B2, incorporated by reference herein in its entirety, discloses configuring functional capabilities in a data processing system comprising entitlement data in a non-volatile storage. The position of the data processing system is determined. Based on the position, functional capabilities change based on position information comprised in the entitlement data.

Document US2009/0319635 A1, incorporated by reference herein in its entirety, discloses a method, apparatus and program product for managing education entitlement data by storing entitlement data received from a plurality of application providers. Inventory data associated with a networked computing device or an application executable on the networked computing device is monitored. A delivery of the entitlement data to the networked computing devices is enabled according to the inventory data.

However, one element of entitlement management is to ensure that no resources of the computing devices may be used without a certified entitlement record. The manufacturer of the processor ensemble would like to ensure that no more resources in the computer ensemble may be used than allowed by ensemble entitlement records.

BRIEF SUMMARY

Thus, there may be a need to overcome the limitations of current entitlement record control, in particular ensuring a trusted way that no more than the licensed resources within a group of computers may be usable. This need may be addressed by an entitlement system, an entitlement control method, and a computer program product according to one or more aspects of the invention.

In one aspect, an entitlement system is provided that includes a management controller adapted to control at least two computing devices. The management controller includes, for instance, a trusted platform module, the trusted platform module comprising a non-volatile storage for storing ensemble entitlement records; a receiver adapted to receive ensemble entitlement records in a first encrypted form, the received ensemble entitlement records to be stored in the non-volatile storage; a generator adapted to generate sub-entitlement records in a second encrypted form based on the received ensemble entitlement records; and a distribution unit adapted to distribute the encrypted sub-entitlement records to a plurality of management units of the at least two computing devices to enable a dynamic configuration change of one or more computing devices of the at least two computing devices based on the sub-entitlement records.

BRIEF DESCRIPTION OF THE SEVERAL VIEWS OF THE DRAWINGS

Embodiments of the invention will now be described, by way of example only, and with reference to the following drawings.

DETAILED DESCRIPTION

Figure 1:
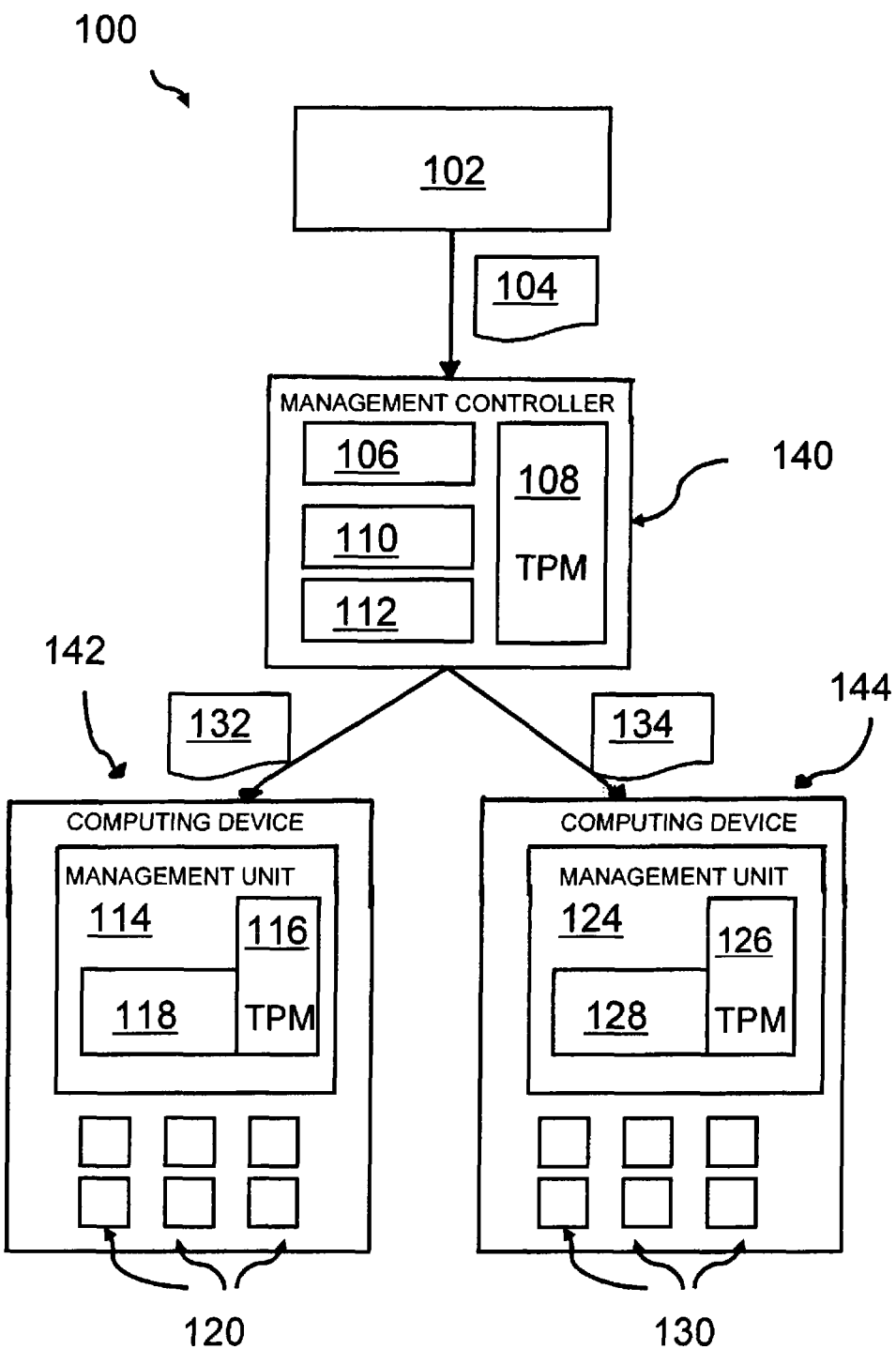
FIG. 1 shows a block diagram of an embodiment of an entitlement system and its components, in accordance with one or more aspects.

In the context of this description, the following conventions, terms and/or expressions may be used:

The term "computing device" may denote any kind of computerized system comprising a processor and a connected memory such that program instructions may be executed. There may be no dependency on a specific operating system. A computing device may be a mainframe computer, a server, a classical PC as well as an, e.g., Android or Windows operated smartphone or tablet computer.

The term "management controller" may denote a control device configured for controlling the operation of computing devices. A management controller may control a plurality of computing devices which may be organized as an ensemble of computing devices.

The term "trusted platform module" may denote a secure element to which data manipulation should be prevented. In one embodiment, a trusted platform module may be a secure storage, e.g., in form of a smartcard. The data in the memory of the smartcard may not be altered without permission. Unauthorized personnel may not be able to read from the trusted platform module or store in a forbidden way additional data in the trusted platform module without destroying it.

The term "ensemble entitlement record" may denote information describing rights or licenses to use certain resources of a computing device, in particular resources of a group of computing devices called an ensemble. In the ensemble entitlement record, it may be defined how many resources may be used within the group of computing devices. In the same sense, sub-entitlement records may control the access to resources in a respective computing device.

The term "configuration means" may denote a controller adapted for enabling and/or disabling resources within a computing device. If, e.g., a computing device may comprise five processors, and if an entitlement record may allow using three processors, the configuration means may switch off two of five available processors. However, the configuration means may control any of the available resources within the computing device, including access to certain software modules or microcode routines, I/O controller, CPUs, blades.

The term "resource" or "computing resources" may denote any directly controllable element within a computing device. This may include processors, memory banks, hard drives or parts thereof, communication links, and the like, as mentioned above. Basically, every resource which may be switched on and/or off may denote here a computing resource.

The term "sub-entitlement record" may denote a logical, partial element or derivative of an ensemble entitlement record. If, e.g., an ensemble entitlement record may comprise the allowance to use five processors within a computing complex comprising a plurality of computing devices, each comprising a group of processors, a sub-entitlement record for one computing device may allow a usage of two processors. Another sub-entitlement record may allow a usage of three processors of another computing device of the same computing device ensemble. The management controller may be responsible for not issuing sub-entitlement records for more than five processors in total.

The term "configuration change" may denote the process of changing an actual configuration of a computing device. The configuration change may be dynamic, meaning that the related computing device may be reconfigured without a reboot in-between.

"Returning parts of a sub-entitlement record" may denote the process of making components of a separate entitlement record available to another computing device. The computing system no longer requiring a certain resource may shut down the operation of that specific resource and return the allowance/license/related sub-entitlement record for reuse by a comparable resource on or in another computing device back to the management controller of the ensemble of computing devices.

Resources of a computer system may be assigned for usage dynamically. Today's computer systems often comprise more physical resources already installed inside the computer system than a user may have licensed. Thus, a control over the used resources is required. If the computer system is a multiprocessor system of an ensemble of computer systems, like a cluster, an assignment of resources available within different parts of a cluster is required to be managed dynamically. A sublicense or sub-entitlement to use a resource on a first computing system of a cluster may be transferred to a second computing system within the same cluster or ensemble. Additionally, reconfigurations and expansions of existing license terms may be performed with the same technique. It may be noted that the transfer of entitlement records and sub-entitlement records may be done in two encrypted formats. The first encryption form may be used in the communication between the manufacturer of the computing systems and a management controller. The second encryption form may be used in the communication between the management controller and the management units of the computing systems or ensemble members. This may guarantee that license cheating may be suppressed successfully. A manipulation of entitlement records or sub-entitlement records may be prevented.

Furthermore, resources that may no longer be required within one computing system of an ensemble may dynamically return a sub-entitlement record to the management controller from where it may be distributed to another computing system of the same ensemble. Thus, the allowance to use computing resources in different computing systems may be transferable in a highly secure manner. Also reconfigurations of one computing system of an ensemble may be done with support of aspects of the proposed method. Also here, a dynamic assignment of available resources in a highly secure way may be done. The encryption into different forms using different private and public keys in both cases may ensure that only licensed resources may be accessible, even if they are installed in or on different computing systems of the same ensemble without license manipulation.

According to one aspect, an entitlement system may be provided. The entitlement system may comprise at least two computing devices and a management controller. The management controller and computing devices may each comprise a trusted platform module. The trusted platform modules may each comprise a non-volatile storage for storing entitlement records. The computing devices may further each comprise a management unit. The management units may comprise configuration means to enable and disable computing resources of the respective computing device based on entitlement records. The management controller may control the computing devices via the management units.

The management controller may comprise a receiver adapted to receive ensemble entitlement records in a first encrypted form and storage adapted to store the received ensemble entitlement records in the non-volatile storage of its trusted platform module. The management controller may also comprise a generator adapted to generate sub-entitlement records in a second encrypted form based on the ensemble entitlement records, and a distribution unit adapted to distribute the encrypted sub-entitlement records to the management units of the computing devices.

The configuration means may be adapted to receive the encrypted sub-entitlement records from the management controller, and may store the received sub-entitlement records in the respective non-volatile storage of its respective trusted platform module. The configuration means may enable and disable resources of the respective computing device based on the sub-entitlement records stored in the respective non-volatile storage of its respective trusted platform module. This way, dynamic configuration changes of the related computing devices may be enabled in a secure way and controlled by a single instance.

According to one embodiment of the entitlement system, the first encrypted form and the second encrypted form may each be based on a private encryption key and public decryption key combination respectively. The key pairs of the first and second encryption may be different. Thus, entitlement records and sub-entitlement records may be encryptable with different methods and/or different keys increasing the security of the overall system.

According to a further embodiment of the entitlement system, the first encryption form may be based on a first private key only known by the manufacturer of the trusted platform module of the management controller. The related corresponding public decryption key may be stored in the trusted computing platform of the management controller. However, if the public decryption key may undergo a manipulation, potentially received ensemble entitlement records may no longer be decryptable with the consequence that physically available resources in the computing system may not be accessible.

According to a further embodiment of the system, the second private key of the second encryption form may be stored in the trusted platform module of the management controller, in particular in a smartcard in which storage may be not alterable by unauthorized personnel. Thus, generated sub-entitlement records may be transferred in a secure way to the management units of the respective computing devices.

According to an additional embodiment of the entitlement system, the second public key corresponding to the second private key is stored in the trusted platform module of each of the management units of the computing devices. Thus, also a transfer of sub-entitlement records from the management controller to the management units may be performed in a trusted way.

According to one embodiment of the entitlement system, the ensemble entitlement record may comprise an ensemble member record defining which computing device of the at least two computing devices may be adapted to receive a respective sub-entitlement record. This feature may allow— from a central perspective—to define for an ensemble of computing devices which resource of which computing device of the ensemble may be enabled. Thus, the management controller may no longer be free in determining which resources in which computing devices may be activated. It may be the case that not all resources in a computing device of an ensemble may be activatable.

In one embodiment, it may also be possible that each of the two computing devices may request sub-entitlement records via the related management unit from the management controller. This feature may be activated if a workload on the respective computing system may reach a maximum available computing power of the computing device. This way, a dynamic request of sub-entitlement records managed in the management controller may be achieved. A better distribution of workload among the computing devices of an ensemble of computing devices may be guaranteed.

One option in another embodiment may also be that each of the two computing devices may return parts of a sub-entitlement record to the management controller module via the related management unit for no longer required resources in the respective computing device. For this feature, the sub-entitlement records may not be "atomic" meaning that one sub-entitlement record controls exactly one resource. However, one sub-entitlement record may allow controlling a plurality of resources of a computing device. Those resources that may no longer be required for an actual workload may "fall asleep". The related part of the sub-entitlement record may be returned or sent back to the management controller. Alternatively, the management controller may be informed that the computing device may no longer use the related resource portion of the sub-entitlement record. For a new use of the related resource, a new sub-entitlement record component may be requested from the management controller.

In a further embodiment of the entitlement system, the returned sub-entitlement record may be encrypted in a third form using a separate private key of the trusted platform module of the related management unit. With this, the trusted communication loop between the management controller and the management units may be closed. The private key of the trusted platform module of the related management unit may be installed during manufacturing of the related computing devices. The returned sub-entitlement record(s) may then be decrypted in the management controller using a corresponding public key.

It may also be noted that encryption forms other than the asymmetric private/public key encryption method may be used for all encryptions forms mentioned within this document.

According to another aspect, an entitlement control method for at least two computing devices and a management controller may be provided. The management controller and the computing devices may each comprise a trusted platform module. The trusted platform modules may each comprise a non-volatile storage for storing ensemble entitlement records. The computing devices may each further comprise a management unit which may comprise configuration means to enable and disable computing resources of the respective computing device based on entitlement records. The management controller may control said computing devices via the management units.

The method may also comprise receiving ensemble entitlement records in a first encrypted form by the management controller, and storing the received ensemble entitlement records in the non-volatile storage of its trusted platform module. The method may further comprise generating sub-entitlement records in a second encrypted form based on the ensemble entitlement records by the management controller, distributing the encrypted sub-entitlement records to the management units of the computing devices enabling a dynamic configuration change of the related computing devices, and receiving the encrypted sub-entitlements records from the management controller by the management units. Moreover, the method may comprise storing received sub-entitlement records in the respective non-volatile storage of its respective trusted platform module.

Hence, the configuration means may enable and disable resources of the respective computing device based on the sub-entitlement records stored in the respective non-volatile storage of its respective trusted platform module in a trusted way.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, e.g., between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the entitlement system is given. Afterwards, further embodiments and the entitlement control method will be described.

FIG. 1 shows a block diagram 100 of an embodiment of the entitlement system 100 and its components. The entitlement system 100 may comprise at least two computing devices 142, 144 and a management controller 140. The management controller 140 and the computing devices 142, 144 may each comprise a trusted platform module 108, 116, 126. The trusted platform modules (TPM) 108, 116, 126 may each comprise a non-volatile storage for storing at least one ensemble entitlement record 104 or sub-entitlement record 132, 134, respectively.

Such an ensemble entitlement record 104 may be encrypted in a first encryption form using a private key only known to a manufacturer 102 of the computing systems 142, 144.

Such an ensemble entitlement record 104 may be generated and signed with the manufacturer's private key by the manufacturer 102 and may comprise licenses for the overall accessible resources in an ensemble of computing devices. These may comprise a number and type of hardware computing resources or firmware (microcode) or software features and functions 120, 130 that may be used within the ensemble of computing devices 142, 144. The ensemble entitlement record 104 may be tied to the ensemble management controller 140 or, in short, the management controller 140 by means of the unique, non-cloneable hardware identifier, e.g., the serial number of the management controller 140 to ensure that it may only be used in this specific ensemble management controller 140. In the given example, computing devices 142, 144 may define an ensemble of computing devices.

Moreover, one or more ensemble member records 204 (see FIG. 2) may be generated and signed with the manufacturer's private key by the manufacturer 102 and may contain a list of the ensemble members, i.e., computing devices 142, 144, by using their unique, non-cloneable identification. This may, e.g., be the serial number of the management unit 114, 124 of an ensemble, a processor ID or any other unique flag. The ensemble member record 204 may be linked to the ensemble entitlement record 104, e.g., by means of the management controller 140 serial number. The content of the ensemble entitlement record 104 and the ensemble member record 204 may also be combined in a single record.

The management units 114, 124 may comprise configuration means 118, 128 to enable and disable computing resources 120, 130 of the respective computing device 140, 142 based on at least one entitlement record 104, wherein said management controller 140 controls said computing devices 142, 144 via said management units 114, 124.

Thus, a receiver 106 in the management controller 140 may be adapted to receive at least one ensemble entitlement record 104 in a first encrypted form from the manufacturer 102 and storage (compare FIG. 2, 200) adapted to store the received ensemble entitlement record 104 in the non-volatile storage 200 of its trusted platform module 108. The management controller 140 may also comprise a generator 110 adapted for generating at least one sub-entitlement record 132, 134 in a second encrypted form based on the at least one ensemble entitlement record 104.

The management controller 140 of the ensemble may also comprise a distribution unit 112 adapted to distribute the encrypted sub-entitlement records 132, 134 to the management units 114, 124 of the computing devices 142, 144 enabling a dynamic configuration change of the related computing devices 142, 144.

The management units 114, 124 may be adapted to receive the encrypted sub-entitlement record 132, 134 from the management controller 140, and to store the received sub-entitlement records 132, 134 in the respective non-volatile storage of its respective trusted platform module 116, 126. The configuration means 118, 128 may enable and disable resources 120, 130 of the respective computing device 142, 144 based on the sub-entitlement records 132, 134 stored in the respective non-volatile storage of its respective trusted platform module 116, 126.

Hence, a secure communication of the ensemble entitlement record 104 to the management controller 140 as well as an independent secure communication of related sub-entitlement records 132, 134 from the management controller 114 to the computing devices 142, 144 may be guaranteed. This may represent a clear differentiator to state-of-the-art technologies not allowing a two-stage encryption of entitlement records.

Figure 2:
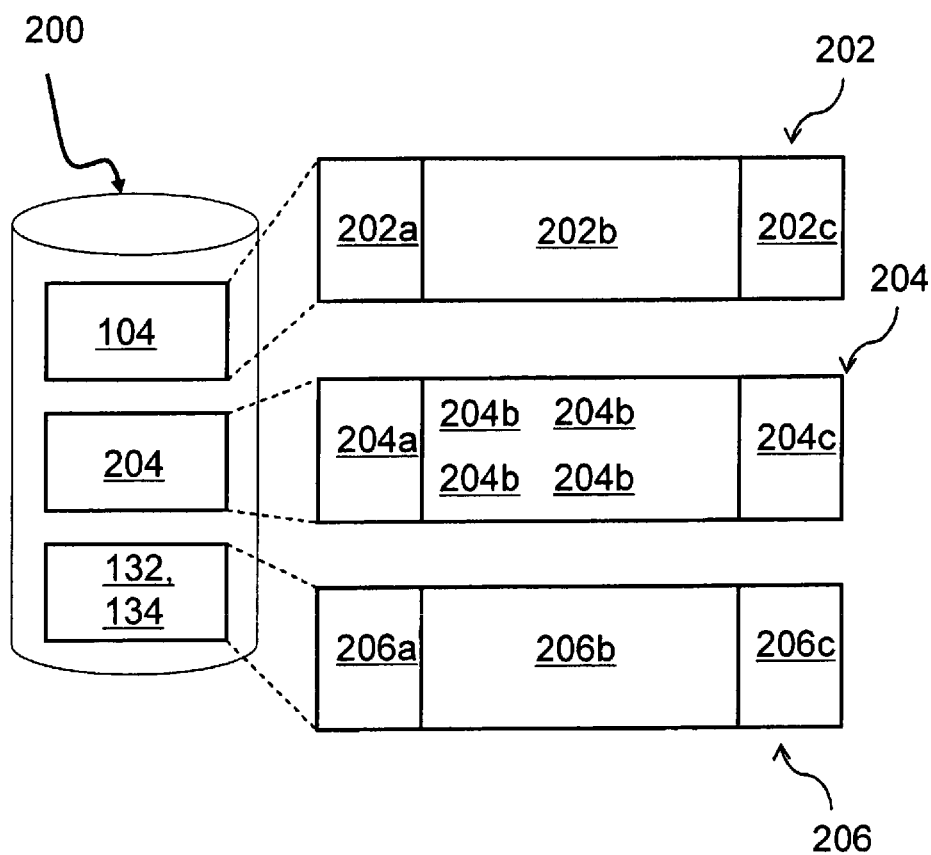
FIG. 2 shows an exemplary block diagram of a non-volatile storage and related entitlement elements.

FIG. 2 shows an exemplary block diagram of a non-volatile storage 200 of the trusted platform module 108 of the management controller 140. Also shown are different types of entitlement records in the non-volatile storage 200.

The ensemble entitlement record 104 may comprise a serial number 202a of the management controller 140, usable resources 202b within the related ensemble of computing devices 142, 144 and, a signature 202c, which may be a component of the security concept based on the private/public key pair.

An optional ensemble member record 204 may comprise a serial number 204a of management controller 140, serial numbers 204b of management units 114, 124 of ensemble members or computing devices 142, 144 and, a signature 204c, which may be a component of the security concept based on the private/public key pair.

Sub-entitlement records 132, 134 may comprise a serial number 206a of the management unit 114, 124, serial number 206b of resources 120, 130 to be used (e.g., 10 CPUs, or 100 GB disk space or the like) and, a signature 206c which may be a component of the security concept based on the private/public key pair.

Figure 3A:
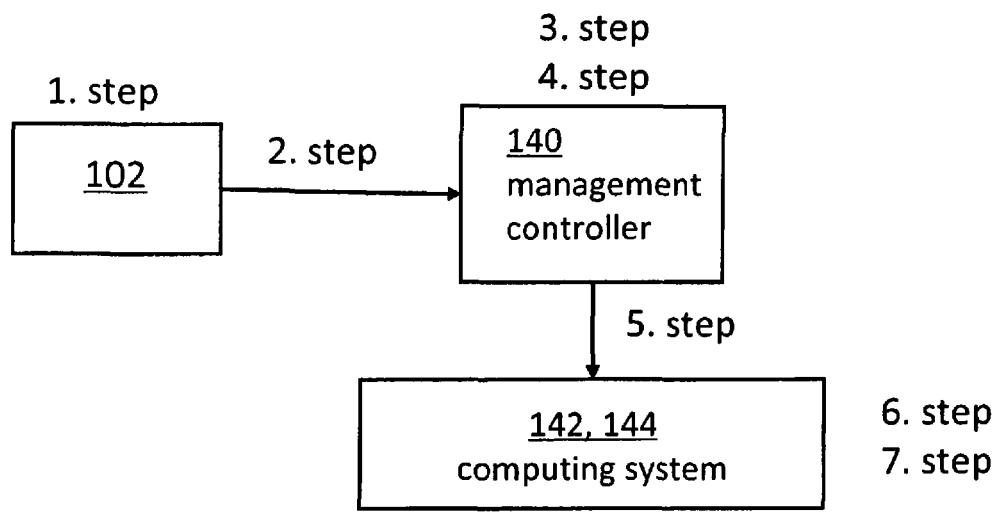
FIGS. 3a, 3b show a block diagram of different steps of the method, in accordance with one or more aspects.

FIG. 3a shows a block diagram of different steps to be performed by elements of the ensemble entitlement system 100.

1st Step: the manufacturer 102 may generate an ensemble entitlement record 104 and optionally an ensemble member record 204. The ensemble entitlement records 104 may be encrypted with the private key of the manufacturer 102.

2nd Step: The manufacturer 102 may send these ensemble entitlement record(s) 104 to the management controller 140. This may be performed via the Internet or using media such as a CD, DVD or, any other portable storage (e.g., a flash memory device, an USB stick, or the like).

3rd Step: The management controller 140 may control one or more ensemble members, i.e., computing devices 142, 144. The management controller 140 may comprise the trusted platform module 108 with required private key(s) preinstalled during manufacturing. The trusted platform module 108 may not be accessible/changeable by a customer. An implementation example of a trusted platform module instance may be a smartcard which may be shipped with the management controller 140 with pre-installed private key(s). The smartcard, in particular an included storage may not be readable/writable by a customer.

Thus, the activity in step 3 may be to receive/import at that management controller 140 the ensemble entitlement record(s) 104 and verifying the signature 202*c* using the trusted platform module 108 within the management controller 140 and to verify that the received ensemble entitlement records came from the manufacturer 102.

4th Step: also the unique identifier of the management controller 140—e.g., the serial number 202*a* of the management controller 140—may be checked against the record ensuring that the received ensemble entitlement record belongs to the management controller 140.

If both checks are okay the records may be stored in the non-volatile secure storage 200 of the trusted platform module 108. Optionally, it may again be signed using the private key of the trusted platform module 108 of the management controller 140.

Until here, process and elements to transfer ensemble entitlement records 104 from the manufacturer 102 to the management controller 140 have been described.

Figure 3B:
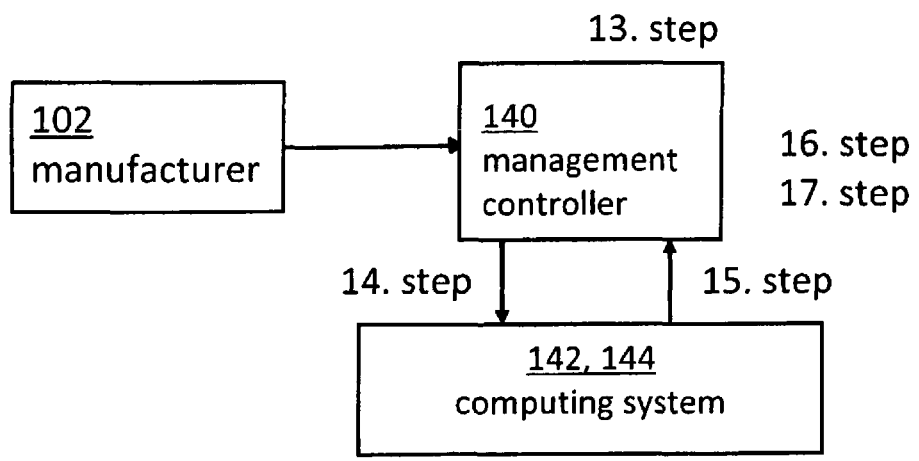

One or more of the following steps may not be recognizable in FIG. 3*a* and FIG. 3*b*. Nevertheless, they may be performed as part of the method.

5th Step: A user at the management controller 140 may decide that a number of resources 120 may be needed for an ensemble member, i.e., computing device 142. The user may be a manual user or an automatic program. A request from the management unit 114 may be issued to the management controller 140 to provide the required number of entitlements for resources 120 to the management unit 114.

6th Step: The management controller 140 may check if the management unit 114 of the computing device 142 may be listed in the related ensemble member record, and if sufficient licenses for resources 120 may still be available in the ensemble entitlement record 104.

7th Step: If both are true the trusted platform module 108 of management controller 140 may generate a sub-entitlement record 132 comprising the management unit's 114 unit identifier—e.g., serial number—and the number/type of the resources for the management unit 114, and may sign it with its private key. If a sub-entitlement record 132 for this management unit 114 may already exist from a previous resource assignment, the existing sub-entitlement record 132 may be modified and signed with the private key stored in the trusted platform module 108 of the management controller 140.

8th Step: Then the updated sub-entitlement record 132 may be stored in the management controller's 140 trusted platform module 108 secure non-volatile storage 200 for, e.g., a bookkeeping of how many of the ensemble entitlement record resources are already used up.

9th Step: The management controller 140 may push the sub-entitlement record 132 to the management unit 114. It may be noted that the trusted platform modules 116, 126 in the computing devices 142, 144 may have pre-installed private and/or public keys from the manufacturer. The keys may not be accessible/changeable by any customer. Also here, implementation examples of a trusted platform module 116, 126 of a computing device 142, 144 may be a smartcard attached and accessible to the management unit 114, 124, or a cryptographic hardware support in the computing device 142, 144, which may be available in an IBM System z complex.

10th Step: The management unit 114 may receive sub-entitlement records 132, and the management unit's 114 trusted platform module 116 may verify the serial number and signatures (see above).

11th Step: If both are okay the sub-entitlement record may be stored in the non-volatile storage of the trusted platform module 116 of the management unit 114 (126, 124 respectively).

12th Step: resources may now be activated within the computing device 142 of this management unit 114 using the configuration means 118. Resources may now be used on this computing device 142 even if no connection to the management controller 140 may exist. I.e., entitlements may be self-contained in the related computing system 142.

Referring now also to FIG. 3*b*, additional steps for returning sub-entitlement records 132, 134 back to the management controller 140 may now be described.

13th Step: A user of the management controller 140—or an automatic program—may decide that one or more resources 120, 130 specified in the sub-entitlement record may no longer be needed in one of the computing devices 142, 144.

14th Step: The management controller 140 may send a notification to the management unit 114 to return usage allowances/licenses for one or more resources 120.

15th Step: The management unit 114 may send an updated sub-entitlement record 132 back to the management controller 140. Alternatively, the related sub-entitlement record 132 may simply be deleted by the management unit 114 or a notification may be sent to the management controller 140 accordingly.

16th Step: The trusted platform module 108 of the management controller 140 may verify the serial number and the received signature of the sub-entitlement record 132.

17th Step: If both are okay the trusted platform module 108 may store the updated sub-entitlement record 132 in its secure storage. If this sub-entitlement record 132 may have no more resources 120 assigned it may be removed from the secure storage. The ensemble entitlement record bookkeeping may be updated to allow resources 120, 130 to be used on another computing device 144.

The last described communication may also be performed in a third encrypted form, as already described above.

Figure 4:
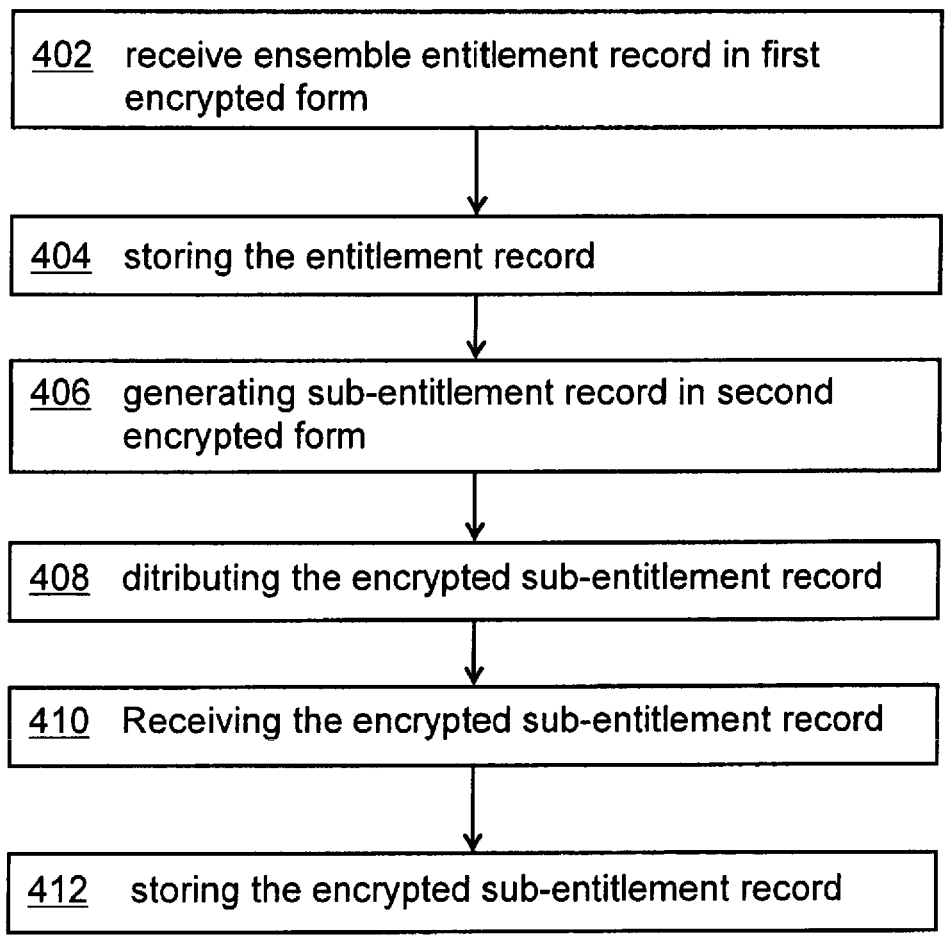
FIG. 4 shows an embodiment of an entitlement control method.

FIG. 4 shows an exemplary block diagram of the entitlement control method 400 for at least two computing devices 142, 144 and a management controller 140. The management controller 140 and the computing devices 142, 144 may each comprise a trusted platform module. The trusted platform modules 108, 116, 126 may each comprise a non-volatile storage 200 for storing entitlement records 104, 132, 134, respectively. The computing devices 142, 144 may each further comprise a management unit 114, 124, the management units 114, 124 comprising configuration means 118, 128 to enable and disable computing resources 120, 130 of the respective computing device 142, 144 based on entitlement records, wherein said management controller 140 controls said computing devices 142, 144 via said management units 114, 124.

The method 400 may comprise the following steps: Receiving, 402, ensemble entitlement records 104 in a first encrypted form by the management controller 140. The ensemble entitlement record(s) 104 may be stored, 404, in the non-volatile storage 200 of its trusted platform module 108. The method 400 may further comprise generating, 406, sub-entitlement records 132, 134 in a second encrypted form based on the ensemble entitlement record(s) 104 by the management controller 140.

The method 400 may also comprise distributing, 408, the encrypted sub-entitlement record(s) 132, 134 to the management units 114, 124 of the computing devices 142, 144 enabling a dynamic configuration change of the related computing devices 142, 144, and receiving, 410, the encrypted sub-entitlements record(s) 132, 134 from said management controller 140 by the management units 114, 124, and storing, 412, the received sub-entitlement record(s) 132, 134 in the respective non-volatile storage of its respective trusted platform module 116, 126.

This way, the configuration means 118, 128 may enable and disable resources 120, 130 of the respective computing device 142, 144 based on the sub-entitlement record(s) 132, 134 stored in the respective non-volatile storage of its respective trusted platform module 116, 126.

Figure 5:
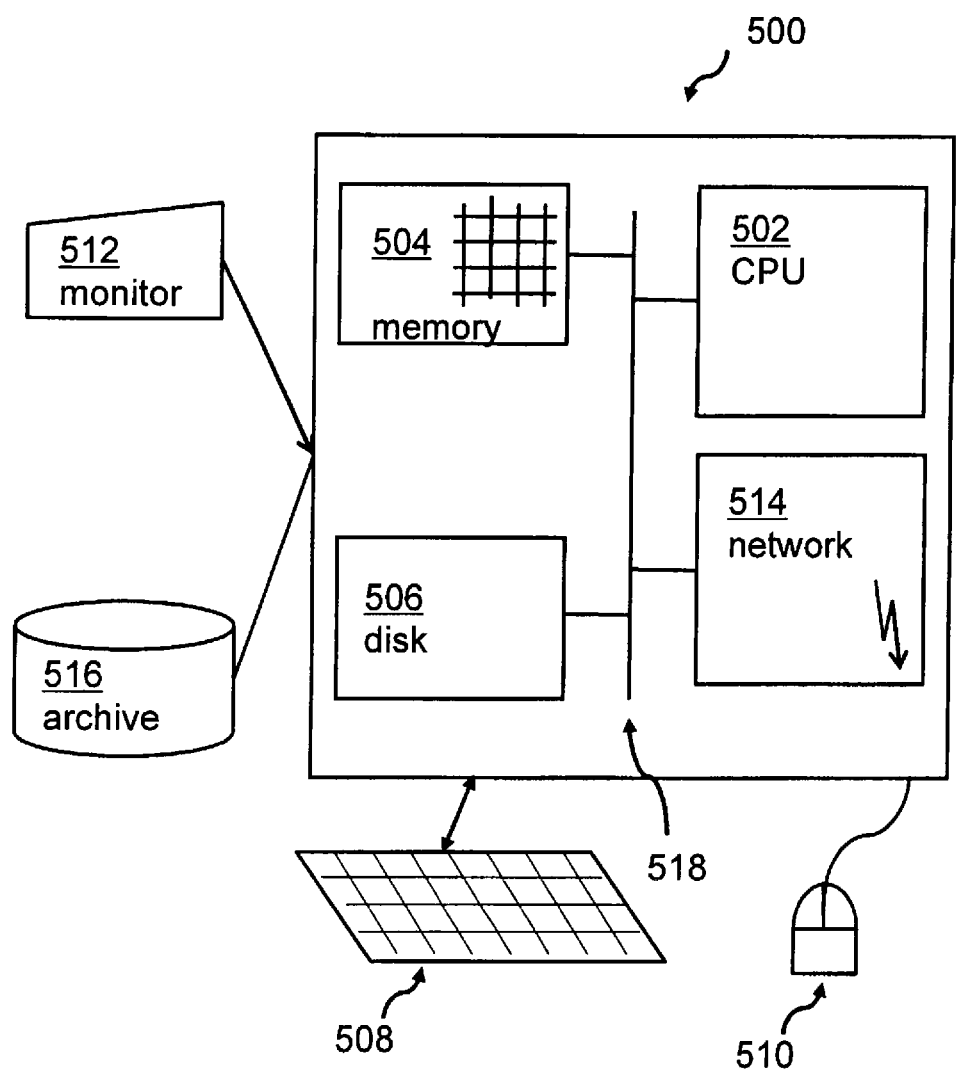
FIG. 5 shows an embodiment of a computing system used for elements of the described system.

Embodiments of the invention may be implemented together with virtually any type of computer 500 or computing device 142, 144. Also the management controller 140 may be built in the form of any type of computer. This may be regardless of the platform being suitable for storing and/or executing program code. For example, as shown in FIG. 5, a computing system 500 or computing device 142, 144 may include one or more processor(s) 502 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. It may be noted that the secure storage—e.g., the already mentioned smartcard—of the trusted platform module 116, 126 may also be attachable to the bus system 518. An adapter may be needed for this. It may also be noted that the management units 114, 124 may be separate computing devices which may control the respective computing device 142 and 144. Also trusted platform modules 108, 116, 126 may each be attached to the bus 518 as components of the respective computing system (not shown). However, the management controller 140 may optionally be integrated into a computer system 500 as a sub-component.

The computing system 500 may also include input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of aspects of the invention, as disclosed herein. Accordingly, the scope of aspects of the invention should be limited only by the attached claims. Also, elements described in association with different embodiments may be combined. It should also be noted that reference signs, if any, in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below, if any, are intended to include any structure, material, or act for performing the function in combination with other claimed elements, as specifically claimed. The description of the aspects of the present invention has been presented for purposes of illustration and description, but is not intended to be exhaustive or limited to the invention in the form disclosed. Many modifications and variations will be apparent to those of ordinary skills in the art without departing from the scope and spirit of the aspects of the invention. The embodiment was chosen and described in order to best explain the principles of the aspects of the invention and the practical application, and to enable others of ordinary skills in the art to understand the aspects of the invention for various embodiments with various modifications, as are suited to the particular use contemplated.

What is claimed is:
1. An entitlement control method comprising:
controlling, by the one or more processors, via a management controller, at least two computing devices, the management controller comprising a trusted platform module, the trusted platform module comprising a non-volatile storage for storing ensemble entitlement records, and wherein the controlling comprises:
receiving, by the management controller, an ensemble entitlement record in a first encrypted form, wherein the ensemble entitlement record describes a maximum quantity of a resource that may be used by a group of computing devices;
decrypting, by the management controller, utilizing a public key of a first key pair stored in the non-volatile storage of the trusted platform module, the ensemble entitlement record;
storing the received ensemble entitlement record in the nonvolatile storage of the trusted platform module;
generating sub-entitlement records, wherein each sub-entitlement record describes a quantity of the resource that may be used by a particular computing device in the group of computing devices, and wherein the quantities specified by the sub-entitlement records do not collectively exceed the maximum quantity specified by the ensemble entitlement record;
encrypting the sub-entitlement records in a second encrypted form utilizing a private key of a second key pair, wherein the private key is stored in the non-volatile storage of the trusted platform module of the management controller;

distributing, by the management controller, one of the encrypted sub-entitlement records to each of the at least two computing devices; and at each computing device of the at least two computing devices: receiving an encrypted sub-entitlement record, decrypting the encrypted sub-entitlement record using the public key of the second key pair, storing the decrypted sub-entitlement record in non-volatile storage of the computing device, and configuring the computing device to use the quantity of the resource specified in the sub-entitlement record.

2. The entitlement control method of claim 1, wherein the non-volatile storage of each of the at least two computing devices, comprises an individual trusted platform module and an individual management unit, wherein the respective sub-entitlement record of the sub-entitlement records is stored in the individual trusted platform module of the non-volatile storage of each of the at least two computing devices, and wherein resources of the respective computing device are enabled and disabled based on the sub-entitlement records stored in the non-volatile storage of each of the at least two computing devices.

3. The entitlement control method according to claim 1, wherein the first encrypted form and the second encrypted form cannot be encrypted with a single key.

4. The entitlement control method according to claim 1, wherein the first encrypted form is based on a first private encryption key only known by a manufacturer of the trusted platform module of the management controller.

5. The entitlement control method according to claim 1, further comprising requesting by each of the at least two computing devices from the management controller sub-entitlement records via a management unit of the computing device, wherein each computing device returns portions of a sub-entitlement record to the management controller via its respective management unit for no longer required resources in the respective computing device, and wherein the returned sub-entitlement record is encrypted in a third form using a private key of a trusted platform module of the respective management unit.

6. An entitlement system comprising:
a memory;
one or more processors in communication with the memory; and
program instructions executable by the one or more processors via the memory to perform a method, the method comprising:
controlling, by the one or more processors, via a management controller, at least two computing devices, the management controller comprising a trusted platform module, the trusted platform module comprising a non-volatile storage for storing ensemble entitlement records, and wherein the controlling comprises:
receiving, by the management controller, an ensemble entitlement record in a first encrypted form, wherein the ensemble entitlement record describes a maximum quantity of a resource that may be used by a group of computing devices;
decrypting, by the management controller, utilizing a public key of a first key pair stored in the non-volatile storage of the trusted platform module, the ensemble entitlement record;
storing the received ensemble entitlement record in the nonvolatile storage of the trusted platform module;
generating sub-entitlement records, wherein each sub-entitlement record describes a quantity of the resource that may be used by a particular computing device in the group of computing devices, and wherein the quantities specified by the sub-entitlement records do not collectively exceed the maximum quantity specified by the ensemble entitlement record;

encrypting the sub-entitlement records in a second encrypted form utilizing a private key of a second key pair, wherein the private key is stored in the non-volatile storage of the trusted platform module of the management controller;

distributing, by the management controller, one of the encrypted sub-entitlement records to each of the at least two computing devices; and at each computing device of the at least two computing devices: receiving an encrypted sub-entitlement record, decrypting the encrypted sub-entitlement record using the public key of the second key pair, storing the decrypted sub-entitlement record in non-volatile storage of the computing device, and configuring the computing device to use the quantity of the resource specified in the sub-entitlement record.

7. The entitlement system of claim 6, wherein the non-volatile storage of each of the at least two computing devices, comprises an individual trusted platform module and an individual management unit, wherein the respective sub-entitlement record of the sub-entitlement records is stored in the individual trusted platform module of the non-volatile storage of each of the at least two computing devices, wherein the method further comprises:

enabling and disabling, by each individual management unit, resources of the respective computing device based on the sub-entitlement records stored in the non-volatile storage of each of the at least two computing devices.

8. The entitlement system of claim 7, wherein the management controller controls the at least two computing devices via the management units.

9. The entitlement system according to claim 6, wherein the first encrypted form and the second encrypted form cannot be encrypted with a single key.

10. The entitlement system according to claim 9, wherein the first encrypted form is based on a first private encryption key only known by a manufacturer of the trusted platform module of the management controller.

11. The entitlement system according to claim 6, wherein the ensemble entitlement record comprises an ensemble member record defining which computing device of the at least two computing devices is adapted to receive a respective sub-entitlement record.

12. The entitlement system according to claim 6, wherein each of the at least two computing devices requests, from the management controller, sub-entitlement records, via a management unit of the computing device.

13. The entitlement system according to claim 12, wherein each of the two computing devices returns portions of a sub-entitlement record to the management controller via its respective management unit for no longer required resources in the respective computing device.

14. The entitlement system according to claim 13, wherein the returned sub-entitlement record is encrypted in a third form using a private key of a trusted platform module of the respective management unit.

15. A computer program product comprising:
a non-transitory computer readable storage medium readable by a processing circuit and storing instructions for execution by the processing circuit for performing a method comprising:
controlling, by a management controller, at least two computing devices, the management controller comprising a trusted platform module, the trusted platform module comprising a non-volatile storage for storing ensemble entitlement records, and wherein the controlling comprises:
receiving, by the management controller, an ensemble entitlement record in a first encrypted form, wherein the ensemble entitlement record describes a maximum quantity of a resource that may be used by a group of computing devices;
decrypting, by the management controller, utilizing a public key of a first key pair stored in the non-volatile storage of the trusted platform module, the ensemble entitlement record;
storing the received ensemble entitlement records record in the nonvolatile storage of the trusted platform module;
generating sub-entitlement records, wherein each sub-entitlement record describes a quantity of the resource that may be used by a particular computing device in the group of computing devices, and wherein the quantities specified by the sub-entitlement records do not collectively exceed the maximum quantity specified by the ensemble entitlement record;
encrypting the sub-entitlement records in a second encrypted form utilizing a private key of a second key pair, wherein the private key is stored in the non-volatile storage of the trusted platform module of the management controller;
distributing, by the management controller, one of the encrypted sub-entitlement records to each of the at least two computing devices; and
at each computing device of the at least two computing devices: receiving an encrypted sub-entitlement record, decrypting the encrypted sub-entitlement record using the public key of the second key pair, storing the decrypted sub-entitlement record in non-volatile storage of the computing device, and configuring the computing device to use the quantity of the resource specified in the sub-entitlement record.

16. The computer program product of claim 15, wherein the non-volatile storage of each of the at least two computing devices, comprises an individual trusted platform module and an individual management unit, wherein the respective sub-entitlement record of the sub-entitlement records is stored in the individual trusted platform module of the non-volatile storage of each of the at least two computing devices, and wherein resources of the respective computing device are enabled and disabled based on the sub-entitlement records stored in the non-volatile storage of each of the at least two computing devices.

17. The computer program product according to claim 15, wherein the method further comprises requesting by each of the at least two computing devices from the management controller sub-entitlement records via a management unit of the computing device, wherein each computing device returns portions of a sub-entitlement record to the management controller via its respective management unit for no longer required resources in the respective computing device, and wherein the returned sub-entitlement record is encrypted in a third form using a private key of a trusted platform module of the respective management unit.

* * * * *